United States Patent Office

3,147,259
Patented Sept. 1, 1964

1

3,147,259
PROCESS OF PREPARING HALOGEN CARRIERS
Laurene O. Paterson, Adrian, Mich., assignor to Drug Research, Inc., Adrian, Mich., a corporation of Michigan
No Drawing. Filed June 22, 1956, Ser. No. 593,047
11 Claims. (Cl. 260—248)

This invention relates to new methods of preparing organic halogen carriers and specifically relates to new methods of preparing organic halogen carriers containing bromine alone or mixtures of chlorine and bromine and is directed particularly to the class of halogen carriers characterized as N-halogen compounds.

Generally, the class of compounds which may be prepared by the present process are characterized as halogenating agents containing at least one N-halogen radical in which structure the halogen atom is loosely bound to the nitrogen atom and is readily available for chemical reaction. Specifically, the products produced by this process are those which contain at least one N-bromo radical and may also contain additional N-bromo or N-chloro groups. Thus compounds such as N-bromo succinimide, N-bromo phthalimide, N-bromocyanuric acids, N-bromo melamines, N,N-dibromo-5-substituted hydantoins, N-bromotoluene-sulfonamide, N-bromo-3α,6α-substituted-glycolurils, N-bromo-5-substituted barbiturates and the like are contemplated as products which may be prepared by this process. In addition, one may also prepare the mixed dihalo-(N-bromo-N-chloro) compounds where more than a single nitrogen atom is in the carrier molecule, such as for example, N-chloro-N-bromo-5-substituted hydantoin.

Those compounds which are particularly preferred are the compounds above which are classified as N-cyclic imides such as the hydantoins, the cyanuric acids, the phthalimides, the glycolurils and the like.

The properties and methods of manufacture for many of these compounds have been described in the chemical literature: N-bromoacetamide, Behrend and Schreider, Ann. 318, 373 (1901), N-bromo succinimide, Ziegler, Am. 551, 109 (1942), N-mono- and N,N-dibromo-dimethyl hydantoin, Orazi, Anales, Asociacion Quimica Argentina, vol. 37, 192 (1949), and vol. 38, 5 (1950). In the preparations as described, the carrier was reacted in alkaline medium with bromine, and the N-brominated compound isolated in a solid crystalline form.

Halogen carriers which contain both bromine and chlorine are also known, being described in my copending application Serial No. 438,633, filed June 22, 1954, now Patent No. 2,779,764, dated January 29, 1957, of which this application is a continuation-in-part. That prior application describes methods of preparing N-bromo-N-chloro-5-substituted hydantoins and N,N-dibromo-5-substituted hydantoins by processes which are contemplated as part of the present invention.

Generally, the methods employed in the prior art to prepare these N-brominated carrier compounds comprise reaction of the unsubstituted carrier with elementary bromine in an aqueous alkaline medium. In such a reaction half of the bromine substitutes for the hydrogen atom in the >N—H radical and the remainder combines with that hydrogen atom to form hydrogen bromide (HBr). This acid then reacts with the alkali present to form the alkali bromide salt as a by-product. The carrying out of this reaction by these prior art methods is sometimes rendered difficult since the carrier compounds are often adversely affected by localized areas of high bromine concentration.

The following equation will illustrate the preparation of N-bromo succinimide from succinimide by this prior art process:

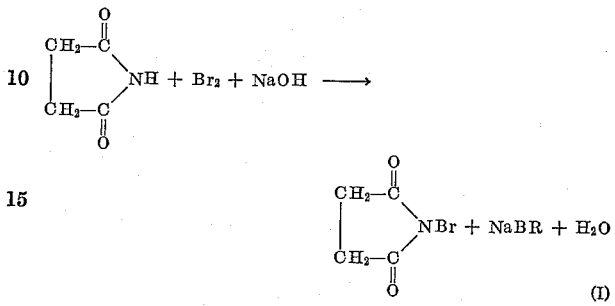

(I)

From this equation it is readily seen that one-half of the bromine introduced into the reaction mixture is lost as by-product. Since bromine is a costly reagent, it would be advantageous to provide a process for preparing N-brominated halogen carriers which does not involve the loss of bromine reagent as by-product.

Accordingly it is an object of the present invention to provide a process for preparing N-bromo halogenating agents which completely utilizes the bromine reactant.

Another object is to provide a process for preparing N-bromo halogen carriers which employs mild reaction conditions.

A still further object is to provide a process for making mixed N-bromo-N-chloro halogen carriers.

Further and additional objects will appear from the following specification and appended claims.

In one broad aspect of this invention there is provided a process for preparing N-bromo halogen carriers containing only bromine which comprises treating an organic nitrogen compound under aqueous alkaline conditions with a bromine producing compound selected from the group consisting of bromine, bromides, and mixtures of bromine and bromides, and passing chlorine into the resultant reaction mixture to produce the desired N-bromo compound. Generally the organic nitrogen compounds which are suitable starting materials to prepare the N-bromo derivatives are organic nitrogen compounds containing at least one radical selected from the group consisting of:

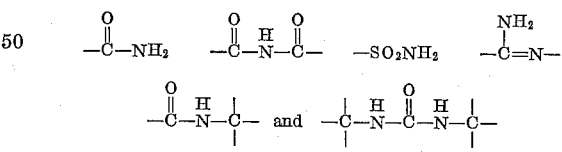

The alkaline conditions described above may be provided by ordinary bases such as sodium hydroxide, potassium hydroxide, sodium bicarbonate, sodium carbonate and the like. Of course it is not absolutely required to use an aqueous medium and in certain instances organic solvents such as acetic acid may also be used. The bromine producer may be elementary bromine or may be a bromide such as a bromine salt of the character of sodium bromide, potassium bromide, and the like, or may be a mixture of bromine and bromide. The amount of bromine producer which is utilized in this particular embodiment of the process should be at least one equivalent of bromine or bromide for each replacement of a removable hydrogen atom contained in the >N—H radicals in one mole of the halogen carrier starting material. Thus, where a carrier starting material contains a single >N—H group an equivalent of bromine producer would correspond to one gram atom. In the instance of elemental bromine, 80 grams or one half mol would be used per mol of carrier. Similarly, where a bromide such as NaBr is used a mole of such bromine producer would be required. Where the carrier starting material contains two >N—H radicals, two equivalents of bromine producer would be one mole of bromine ($Br_2$) or two moles of bromide salt such as NaBr per mole of carrier starting material to produce the desired N,N-dibromo halogen carrier. As is readily seen, an equivalent of bromine producer may be either one mole of bromide such as sodium bromide, or one-half mole of bromine.

It has been found that the bromination of the present process proceeds in a manner which can be best described by consideration of the theoretical sequences involved. When the N-hydrogen carrier precursor is placed in the aqueous alkaline medium and treated with the requisite amount of bromine, the reaction initially proceeds by the replacement of the hydrogen atom with a bromine atom and the formation of NaBr as in the following schematic equation:

$$2>N—H + Br_2 + 2NaOH \rightarrow >N—Br + NaBr + NaOH + >N—H + H_2O \quad (2)$$

By the above equation it may be seen that the reaction results in the formation of a bromine salt except that the >N—H is not completely brominated. However, by addition of elemental chlorine to the reaction mixture it is possible to complete the reaction to produce the desired bromo compound as in the following equation:

$$>N—H + NaBr + Cl_2 + NaOH \rightarrow >N—Br + 2NaCl + H_2O \quad (3)$$

Actually there is no need to preserve any sequence, but the reactions may be carried out simultaneously by introducing chlorine at the same time the bromine producer is added. The chlorine then immediately liberates the bromine from the bromine salt as it is formed. In one specific example the overall equation would appear as the following:

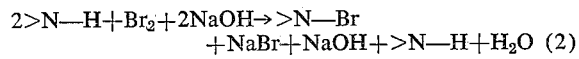

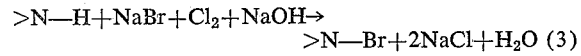

From the above equation it is readily seen that all of the bromine introduced is utilized to produce and appears in the final N-bromo compound. The only waste product is a chlorine salt derived from relatively inexpensive chlorine. It is to be understood that one may use other bromine producers than elementary bromine, such as, for example, sodium bromide. In the event sodium bromide is used, the same procedure would be followed.

The following examples will illustrate various embodiments of the above described process:

*Example 1*

128 grams of 5,5-dimethyl hydantoin were dissolved in 500 milliliters of water containing 106 grams of $Na_2CO_3$. To this solution there were added 103 grams of NaBr, the temperature was lowered to 10° C., and 80 grams of bromine were introduced with rapid agitation. Chlorine gas was then bubbled through the solution to the first permanent darkening of the solution. The resulting N,N-dibromo derivative was filtered off, washed and dried. It weighed 223 grams and analyzed 55.1% bromine.

*Example 2*

99 grams of succinimide were dissolved in 200 ml. of water containing 53 grams of sodium carbonate. To this solution, at 15° C., were added 80 grams of bromine with rapid stirring. When all the bromine had been taken up, gaseous chlorine was introduced to a pH of 6.7. The resultant N-bromo-succinimide was filtered off, washed and dried. It analyzed 44.8% bromine, and had a melting point of 174° C.

*Example 3*

To a suspension of 128 grams of 5,5-dimethyl hydantoin in 500 ml. of iced water containing 40 grams of sodium hydroxide and 55 grams of sodium carbonate were added in admixture 160 grams of bromine and 71 grams of chlorine with rapid agitation. When the halogen mixture had been completely taken up, the N,N-dibromodimethyl hydantoin was filtered off, washed free of sodium chloride, and dried. The yield was 250 grams of a product analyzing 55.2% bromine and having a melting point of 188–189° C.

*Example 4*

59 grams of acetamide, 119 grams of potassium bromide and 53 grams of sodium carbonate were suspended in 150 ml. of water. The temperature was lowered to 10° C. and chlorine gas was introduced to the first permanent darkening of the mixture. The resultant slurry was extracted with chloroform, and the N-bromo acetamide precipitated from this solvent by the addition of hexane. The white crystalline N-bromo-acetamide product weighed 112 grams, and had a melting point of 103–104° C.

*Example 5*

184 grams of 5,5-diethyl barbituric acid were dissolved in 600 cc. of iced water containing 106 grams of sodium carbonate and 103 grams of sodium bromide. To this were added with rapid agitation 80 grams of bromine, and when the bromine had been taken up, chlorine was introduced until a pH of 6.5 was reached. The resultant dibromo-5,5-diethyl barbituric acid was filtered off, washed and dried. In analyzed 46.6% bromine.

*Example 6*

170 grams of 3a,6a-dimethyl glycoluril were suspended in 1500 ml. of water having a temperature of 15° C. To this were added 388 grams of a crude mixture of alkali and alkaline earth bromides analyzing 62% bromine. The introduction of chlorine was commenced and at intervals a total of 160 grams of sodium carbonate were added. When all the sodium carbonate had been taken up and the pH had reached a value of 6.7, the chlorination was stopped. Agitation was continued for one-half hour. The slurry was then filtered, washed and dried. The product consisted of the tribromo derivative of 3a,6a-dimethyl glycoluril. It contained theoretical amounts of active bromine.

As was previously disclosed, this invention also relates to processes for preparing mixed N-bromo-N-chloro carrier compounds such as N-bromo-N-chloro-5-substituted hydantoins, N-chloro-N-bromo cyanuric acids, N-chloro-N-bromo 3a,6a,-substituted glycolurils, and N-chloro-N-bromo melamines in which the positive chlorine and bromine atoms are available for reaction. By a modification of the method applicable to preparing N-bromo compounds wherein all of the halogen is bromine, it is possible to prepare the mixed dihalo materials and still utilize all of the bromine producer in the preparation of the final product without any formation of bromine salt by-product. In one instance this method involves treating a 5-substituted hydantoin with an amount of bromine producing compound equivalent to one-half mole of bromine in an aqueous alkaline solution. The reaction mixture resulting from this treatment is then chlorinated to produce an N-chloro-N-bromo-5-substituted hydantoin.

Under these specified conditions it has been found that elementary bromine reacts initially to form the N-monobromo derivative and where the amount of bromine does not exceed one-half mole the product of this first reaction is amost exclusively an N-monobromo-5-substituted hydantoin. In bromine substitutions using elementary bromine, one half of the bromine present replaces the hydrogen on one nitrogen atom in the hydantoin molecule and the remainder of the bromine forms hydrogen bromide with that replaced hydrogen. Of course, in an aqueous alkaline solution the hydrogen bromide reacts with the base present to form a salt such as NaBr in the case of sodium carbonate used as an alkaline reagent. Ordinarily this bromide salt would be a by-product and lost, but upon chlorination of the reaction mixture with gaseous chlorine, the bromine is liberated from the bromide salt and substitutes the remainder of the hydantoin compound to form N-monobromo-5-substituted hydantoin. Because of this unique characteristic, it is possible to prepare a mono-bromo compound in the substantial absence of dibromo hydantoin. After the bromine and bromine salt has been completely used up and all of the bromine substituted in the hydantoin molecule, further chlorination results in a replacement of the remaining N-hydrogen atom. The final product is the desired N-chloro-N-bromo-5-substituted hydantoin. The waste by-product of this reaction is a chlorine salt such as NaCl and all of the bromine which was introduced into the reaction has been substituted into the hydantoin molecule. The reaction has been described in a stepwise manner, but there is no necessity that such a sequence be preserved since one may introduce the bromine and chlorine simultaneously into the aqueous alkaline solution of the 5-substituted hydantoin and since the bromine preferentially substitutes on the nitrogen atom even to the extent of displacing chlorine, all of the bromine or bromide will be utilized before substitution by chlorine takes place.

Generally, the amount of alkali should be sufficient to neutralize any by-product HCl. Thus to prepare a 5-substituted-1,3-dihalogenated hydantoin, it is preferred to use two equivalents of alkali.

While the foregoing process was specifically restricted to 5-substituted hydantoins, the general aspects of the process are applicable to other N-hydrogen compounds which contain at least two >N—H radicals. Thus in cyanuric acids there are three replaceable hydrogens in >N—H radicals. Treatment of a mole of cyanuric acid with less than three equivalents of a bromine producer and chlorination thereof will produce the N-brominated-N-chlorinated cyanuric acids. Thus a mole of cyanuric acid treated with two equivalents of NaBr and chlorinated will result in N,N-dibromo-N-chloro cyanuric acid. Using one equivalent of bromine producer results in the N-bromo-N,N-dichloro cyanuric acid. A similar procedure is applicable to 3a,6a-substituted glycolurils or acetylene ureas which contain four replaceable hydrogens in >N—H groups. In the procedure for producing mixed N-chloro-N-bromo glycolurils one would use from one to three equivalents of a bromine producer per mole of starting material, and obtain from one to three bromine atoms substituted in the molecule. The glycolurils which are particularly valuable for use with the present process are those containing substituents in the 3a and 6a positions which are the bridgehead carbon atoms. Generally the substituents are the same as those which are hereinafter described for the 5,5-disubstituted hydantoins, although for economy it may be preferred to use only the ethyl and methyl substituted compounds.

As was previously described, the bromine producer can be elementary bromine or a bromide such as sodium bromide or mixtures thereof. That they are equivalent with respect to their utility is readily seen since if liquid or elementary bromine is used to brominate hydantoin, at least half of that bromine forms a bromide salt from which the bromine is liberated by the chlorine gas to complete the bromination.

Representative equations which illustrate these processes are as follows:

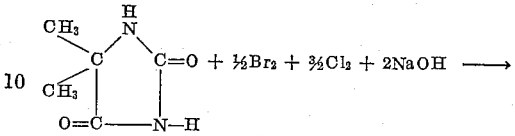

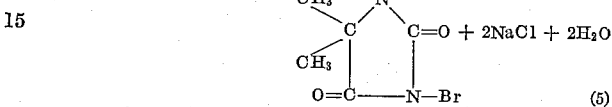

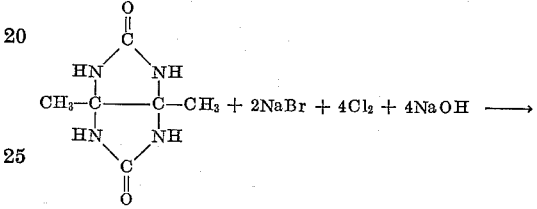

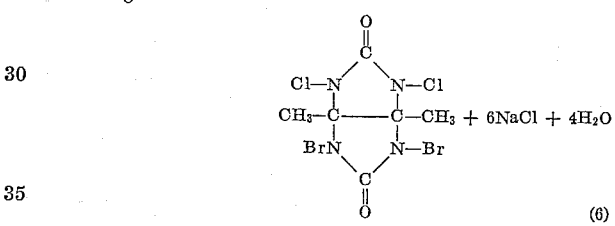

The present invention also contemplates the production of N-halogen carriers wherein all of the N-hydrogens are not substituted with halogen atoms. Thus it is possible by the process of the present invention to produce an admixture of N-chloro-N-bromo-5-substituted hydantoin with N-monobromo-5-substituted hyantoin. It is also possible to produce such compounds as N-chloro-N-bromo-N-hydrogen cyanuric acid. Generally the method utilized involves using less than the theoretical amount of alkali, and terminating chlorination when the reaction mixture reaches a pH on the acid side (ca. 6.5 to 6.8). Thus in example 8 the theoretical amount of alkali required to completely halogenate the mixture is one mole of sodium carbonate or two equivalents thereof. The use of about 80 grams of carbonate results in the production of the chloro-bromo compound in admixture with the N-mono-bromo-5-substituted hydantoin.

The following examples will illustrate the above methods of preparing N-bromo-N-chloro-5-substituted hydantoins and related compounds.

*Example 7*

128 grams of 5,5-dimethyl hydantoin were dissolved in 500 milliliters of water containing 55 grams of $Na_2CO_3$. The temperature of the solution was lowered to 5° C. and 80 grams of bromine had been added, with rapid stirring. When the bromine had been completely taken up, 200 grams of a 20% NaOH solution were added and gaseous chlorine introduced until the resultant slurry became neutral in reaction. The product, after filtering washing and drying, weighed 208 grams.

It analyzed 33% bromine and 14.5% chlorine.

*Example 8*

114 grams of 5-methyl hydantoin were dissolved in 500 milliliters of water containing 80 grams of $Na_2CO_3$. To this solution were added 103 grams of sodium bromide (NaBr), the temperature lowered to 10° C., and chlorine gas introduced until the reaction mixture reached a hydrogen-ion concentration equivalent to a pH of 6.8. The N-halogenated-5-methyl hydantoin thus formed, after filtering, washing and drying, weighed 205 grams. It analyzed 38% bromine and 8.6% chlorine. The resultant N-halogenated derivative consisted of the N-bromo-N-chloro-5-methyl hydantoin in admixture with the N-mono brominated compound.

*Example 9*

129 grams of cyanuric acid were suspended in 800 ml. of water containing 120 grams of sodium hydroxide. To this suspension were added 80 grams of liquid bromine and gaseous chlorine introduced with stirring until the reaction was complete as determined by the pH falling below 7. The resultant product was the N-bromo-N,N-dichloro cyanuric acid. The product analyzed 28.5% bromine and 25% chlorine.

*Example 10*

Chlorine gas was bubbled into a stirred slurry of 170 grams of 3a,6a-dimethyl glycoluril, 212 grams of sodium carbonate, and 258 grams of a crude bromide salt mixture analyzing 62% bromine contained in 1000 ml. of water. Agitation was continued throughout chlorination and when all of the halogen was taken up as determined by pH below 7 in the reaction mixture, the chlorination was discontinued. The desired product N,N-dibromo-N,N-dichloro-3a,6a-dimethyl glycoluril was recovered by filtration.

The 5-substituted hydantoins which are used as starting materials in the present process have the general structure:

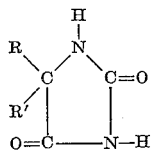

wherein R is a radical selected from the group consisting of hydrogen, saturated aliphatic hydrocarbon radical, and aromatic hydrocarbon radical containing up to about 10 carbon atoms and R' is a radical selected from the group consisting of saturated aliphatic hydrocarbon radical and aromatic hydrocarbon radical containing up to about 10 carbon atoms. In addition to hydrocarbon radicals, the radicals may also contain substituents such as chlorine or other halogen and may be branched or straight chain hydrocarbon radicals.

As another embodiment of the present process, one may produce the chloro-bromo hydantoins in admixture with dibromo hydantoins. Accordingly if a 5-substituted hydantoin is reacted with an amount of a bromine producer which is intermediate between about one equivalent and less than two equivalents, there is obtained a mixture of N-bromo-N-chloro-5-substituted hydantoin and N,N-dibromo-5-substituted hydantoin. Thus the bromine producer in an amount up to one equivalent will react to produce the mixed N-chloro-N-bromo hydantoin. The excess bromine producer would then react to substitute in the remaining nitrogen of the second imide group in hydantoin to produce dibromo since bromine substitution is preferential and occurs to the exclusion of chlorination so long as bromine producing compounds are present and available in the reaction mixture. Therefore, to the extent that the bromine producer is present in excess of an equivalent, the dibromo derivative is formed. Of course, if the bromine producer is present in the amount of two equivalents, the dibromo product would be formed. Also if less than one equivalent of bromine producer is utilized, there will result an admixture of N-bromo-N-chloro and N,N-dichloro hydantoin, since the amount of bromine producer present is insufficient to convert all of the hydantoin to monobromo hydantoin, and the amount unconverted is formed into N,N-dichloro hydantoin.

Such N-chloro-N-bromo-5-substituted hydantoins react quite differently than di-halogenated hydantoins containing chlorine or bromine alone. For instance, the N-dichloro and N-dibromo derivatives tend to substitute allylic to a double bond, whereas N-chloro-N-bromo-5,5-disubstituted hydantoins, possibly due to the difference in electronegativity of the released halogens, add very readily across the double bond to give up to complete saturation. This propery is particularly valuable in the introduction of certain reactive substituents in the manufacture of plastics and synthetic rubber, as disclosed in my copending application Serial No. 510,869, filed May 24, 1955, now U.S. Patent 2,986,555, granted May 30, 1961. It has been found that where predominant substitution by one halogen or the other is desired, small percentages of the minor component catalyze the reaction at the double bond. The present invention thus includes the preparation of various mixtures of N-chloro-N-bromo with other N-chlorinated or N-brominated - 5 - substituted hydantoin derivatives.

The following examples will illustrate the process as applied to prepared mixtures of mixed dihalo hydantoins with dibromo or dichloro hydantoins.

*Example 11*

To a suspension of 142 grams of 5-ethyl-5-methyl hydantoin in 500 milliliters of water there were added 400 grams of a cooled 20% solution of NaOH. To this mixture at 10° C. were added 20 grams of bromine with rapid agitation. When all the bromine had been taken up, the halogenation was completed by the introduction of gaseous chlorine. The resulting product weighed 218 grams and analyzed 9% bromine and 27.5% chlorine and is a mixture of N-bromo-N-chloro-5-ethyl-5-methyl hydantoin with N,N-dichloro-5-substituted hydantoin.

*Example 12*

To a solution of 252 grams of 5,5-diphenyl hydantoin in 500 milliliters of water containing 80 grams of NaOH were added, at 10° C., 100 grams of bromine with rapid stirring. When the bromine had been completely taken up, gaseous chlorine was introduced until the resultant slurry became slightly acid. The product, after filtering, washing and drying, weighed 332 grams. It analyzed 27.5% bromine and 7.2% chlorine. This product consists of a mixture of the N-bromo-N-chloro-diphenyl hydantoin with the N,N-dibromo derivative. It has been found that even such low percentage of chlorine catalyzes addition reactions with olefinic compounds.

It will be noticed that two different types of what might aptly be termed "multi-halogenated" substituted hydantoins can exist, and can be made by the methods herein described. The bromine may be attached to the nitrogen atom in the 1-position which is vicinal to the 5-substituted carbon atom, or may be attached to the nitrogen atom in the 3-position. Thus there may be N-1-bromo-N-3-chloro, or N-1-chloro-N-3-bromo compounds. It has not been definitely established that the N-chloro-N-bromo compounds produced in accordance with the herein described methods are not mixtures of such isomers. In the subjoined claims, both types of chloro-bromo or bromo-chloro products are claimed.

While the radicals on the carbon in the 5-position are given in the examples as being methyl, dimethyl, methylethyl, ethyl, phenyl, diphenyl, or the like, it is to be understood that considerable variations are possible such as 5,5-diethyl, 5-propyl-5-methyl, 5,5-dipropyl, or combinations of aliphatic and aromatic radicals containing up to about 10 carbon atoms in each of the respective radicals recited above.

In summary, it is apparent that the process of the present invention is broadly applicable to the production of N-brominated halogenation agents specifically characterized as being prepared by bromination and chlorination of organic nitrogen compounds containing at least one halogenatable radical selected from the group consisting of:

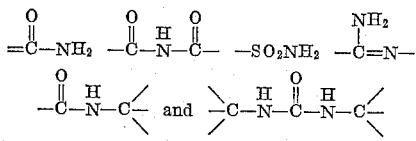

Exemplary of compounds containing such groups or radicals are hydantoin, succinimide, acetamide, phthalimide, cyanuric acid, toluene-sulfonamides, melamines, 5-substituted barbiturates, glycolurils, and the like.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. The method of preparing an N-bromo-N-chloro compound from an N-hydrogen compound having at least two N-hydrogen radicals and selected from the group consisting of hydantoin, 5-substituted hydantoin, melamine, monocyclic hydrocarbonaryl sulfonamide, cyanuric acid, glycoluril, 3a,6a-substituted glycoluril, 5-substituted barbituric acid, the substituent of said substituted compounds being selected from the group consisting of lower aliphatic radicals having 1 to 10 carbon atoms, and monocyclic hydrocarbon aryl radicals having up to 10 carbon atoms which comprises treating said N-hydrogen compound in liquid medium with chlorine in the presence of a bromine-producing compound of the group consisting of elemental bromine, bromides of alkali metals, bromides of alkaline earth metals and mixtures thereof, said bromine-producing compound being present in sufficient quantity to produce at least one N-bromo radical, but less than sufficient to brominate the total number of N-hydrogen radicals to be halogenated, the chlorine being added in quantity sufficient to produce at least one N-chloro radical, said liquid medium containing an alkaline material in at least sufficient quantity to substantially neutralize the by-product hydrochloric acid.

2. The method defined in claim 1 wherein the N-halogenated compound is N-bromo-N-chloro-hydantoin, and is formed from hydantoin using about one equivalent of said bromine-producing compound in a liquid medium having added thereto about two equivalents of inorganic alkaline material.

3. The method defined in claim 1 wherein the N-halogenated compound is N-bromo-N-chloro-5,5-dilower alkyl-hydantoin, and is formed from 5,5-dilower alkyl-hydantoin using about one equivalent of the said bromine-producing compound in a liquid medium having added thereto about two equivalents of inorganic alkaline material.

4. The method defined in claim 1 wherein the N-halogenated compound is N-bromo-N-chloro-5,5-dimethyl-hydantoin, and is formed from 5,5-dimethyl-hydantoin using about one equivalent of the said bromine-producing compound in a liquid medium having added thereto about two equivalents of inorganic alkaline material.

5. The method defined in claim 1 wherein the N-halogenated compound is N-brominated-N-chlorinated-3a,6a-lower alkyl-glycoluril formed from 3a,6a-dilower alkyl-glycoluril using from about 1 to 3 equivalents of the said bromine-producing compound in a liquid medium having added thereto from about two to four equivalents of inorganic alkaline material.

6. The method as defined in claim 1 wherein the N-halogenated compound is N-brominated-N-chlorinated-3a,6a-dimethyl-glycoluril formed from 3a,6a-dimethyl-glycoluril using from about 1 to 3 equivalents of the said bromine-producing compound in a liquid medium having added thereto from about two to four equivalents of inorganic alkaline material.

7. The method defined in claim 1 wherein the N-halogenated compound is N-bromo-N-chloro-p-toluene-sulfonamide formed from p-toluene-sulfonamide using about one equivalent of said bromine-producing compound in a liquid medium having added thereto about two equivalents of inorganic alkaline material.

8. The method defined in claim 1 wherein the N-halogenated compound is N-bromo-N-chloro-benzene-sulfonamide formed from benzene sulfonamide using about one equivalent of said bromine-producing compound in a liquid medium having added thereto about two equivalents of inorganic alkaline material.

9. The method defined in claim 1 wherein the N-halogenated compound is N-brominated-N-chlorinated glycoluril formed from glycoluril using from about 1 to 3 equivalents of the said bromine-producing compound in a liquid medium having added thereto from about two to four equivalents of inorganic alkaline material.

10. The method as defined in claim 1 wherein the N-halogenated compound is N-brominated-N-chlorinated cyanurate formed from cyanuric acid using from about one to two equivalents of the said bromine-producing compound in a liquid medium having added thereto about two to three equivalents of an inorganic alkaline material.

11. The method defined in claim 1 wherein the N-halogenated compound is N-brominated-N-chlorinated melamine formed from melamine using about one to two equivalents of the said bromine-producing compound in the liquid medium.

References Cited in the file of this patent

UNITED STATES PATENTS

| | | |
|---|---|---|
| 2,013,791 | Sachs et al. | Sept. 10, 1935 |
| 2,211,465 | Jewel et al. | Aug. 13, 1940 |
| 2,355,410 | Bergel et al. | Aug. 8, 1944 |
| 2,480,091 | Taylor | Aug. 23, 1949 |
| 2,779,769 | Paterson | Jan. 29, 1957 |
| 2,868,787 | Paterson | Jan. 13, 1959 |

OTHER REFERENCES

Houben: "Die Methoden der Org. Chem.," vol. 3, p. 1146 (1943).

Orazi et al.: Chem Abstracts, vol. 48, col. 13634 (1954).